United States Patent [19]

Bando

[11] Patent Number: 5,389,725
[45] Date of Patent: Feb. 14, 1995

[54] RESIN COMPOSITION CONTAINING FLUORINE-CONTAINING ELASTOMER

[75] Inventor: Toru Bando, Sodegaura, Japan

[73] Assignee: Idemitsu Kosan Co., Ltd., Tokyo, Japan

[21] Appl. No.: 150,022

[22] PCT Filed: Apr. 9, 1993

[86] PCT No.: PCT/JP93/00456
   § 371 Date: Nov. 8, 1993
   § 102(e) Date: Nov. 8, 1993

[87] PCT Pub. No.: WO93/21272
   PCT Pub. Date: Oct. 28, 1993

[30] Foreign Application Priority Data

Apr. 10, 1992 [JP] Japan .................................. 4-091034

[51] Int. Cl.$^6$ ................ C08L 27/12; C08L 69/00; C08L 67/03; C08L 81/00
[52] U.S. Cl. .................. 525/92; 525/146; 525/150; 525/151; 525/153; 525/178; 525/185; 525/189; 525/326.2; 525/326.4
[58] Field of Search .............. 525/92, 146, 150, 153, 525/178, 185, 189, 326.2, 326.4, 151

[56] References Cited

U.S. PATENT DOCUMENTS

| | | | |
|---|---|---|---|
| 3,400,065 | 9/1968 | Barth | 525/905 |
| 3,507,844 | 4/1970 | Wood | 525/326.4 |
| 3,821,326 | 6/1974 | Lauchlan | 525/146 |
| 4,742,126 | 5/1988 | Moggi | 525/326.2 |
| 5,039,722 | 8/1991 | Cantatore | 524/100 |

*Primary Examiner*—David Buttner
*Attorney, Agent, or Firm*—Frishauf, Holtz, Goodman & Woodward

[57] ABSTRACT

The thermoplastic resin composition containing a fluorine-containing elastomer, which is produced by incorporating a base-treated fluorine-containing elastomer into a thermoplastic resin and has a base-treated fluorine-containing elastomer content of 0.1 to 50% by weight, the composition being excellent in impact resistance and heat resistance and useful for producing various products in the fields of aviation, machinery, office machines, electricity and electronics.

19 Claims, No Drawings

RESIN COMPOSITION CONTAINING FLUORINE-CONTAINING ELASTOMER

TECHNICAL FIELD

The present invention relates to a thermoplastic resin composition containing a fluorine-containing elastomer. The composition of the present invention is used for producing a variety of products in the fields of aviation, machinery, office machines, electricity and electronics.

TECHNICAL BACKGROUND

A fluorine-containing elastomer consisting of a copolymer such as a copolymer from vinylidene fluoride and another fluorine-containing monomer is an elastomer excellent in heat resistance and is chemical resistance, and used for various sealing materials or packings.

In recent years, further, a fluorine-containing elastomer has been incorporated into a thermoplastic resin to improve the impact resistance of thermoplastic resins. For example, JP-A-3-263460 discloses an impact-resistant resin composition obtained by incorporating a fluorine-containing elastomer into a polycyanoaryl ether-based resin which is a heat-resistant thermoplastic resin.

As described in the above JP-A-3-263460, however, when a fluorine-containing elastomer is incorporated into a thermoplastic resin, the effect on the improvement in impact resistance is not sufficient although the impact resistance is improved. That is, since the fluorine-containing elastomer has low surface energy and poor wettability to the thermoplastic resin, the compatibility (miscibility) of the fluorine-containing elastomer with the thermoplastic resin is insufficient and the advantage of the fluorine-containing elastomer as an agent for imparting impact resistance cannot be sufficiently worked.

Further, when exposed to a high temperature, the fluorine-containing elastomer is partially decomposed to generate hydrogen fluoride, a strong acid. Therefore, it also has a defect in that a thermoplastic resin composition containing the fluorine-containing elastomer is inferior in heat resistance. As a method for preventing the generation of hydrogen fluoride caused by the decomposition of the fluorine-containing elastomer, JP-A-55-16057 discloses a method in which an amine-containing antioxidant is incorporated into the fluorine-containing elastomer. In view of cost, however, it is not expedient to improve the heat resistance by adding an amine-containing antioxidant to a composition of a thermoplastic resin and a fluorine-containing elastomer, since it increases the number of components which constitute the resin composition. Further, for some intended resin molded articles, it is not undesirable to incorporate an amine-containing antioxidant.

Although the generation of hydrogen fluoride could be prevented by adding an amine-containing antioxidant, it is not possible to expect an effect on the improvement in the impact resistance in all cases.

DISCLOSURE OF THE INVENTION

It is therefore an object of the present invention to provide a novel thermoplastic resin composition containing a fluorine-containing elastomer, which overcomes the above-described defects of conventional thermoplastic resin compositions containing a fluorine-containing elastomer, shows further improved impact resistance and shows improved heat resistance without an antioxidant being incorporated therein.

Studies have been made to achieve the above object, and as a result, it has been found that the treatment of a fluorine-containing elastomer in a basic atmosphere accomplishes the following improvements.

(a) The wettability between the fluorine-containing elastomer and a thermoplastic resin is improved, and when the fluorine-containing elastomer is incorporated into the thermoplastic resin, the elastomer forms fine particles and fully exhibits its properties as an agent for imparting impact resistance. Therefore, the thermoplastic resin composition containing the fluorine-containing elastomer is further improved in impact resistance.

(b) The generation of hydrogen fluoride by the decomposition of a fluorine-containing elastomer is inhibited, and the thermoplastic resin composition containing the fluorine-containing elastomer is improved in heat resistance in the absence of an antioxidant incorporated.

The present invention has been made on the basis of the above findings, and its gist consists in a thermoplastic resin composition containing a fluorine-containing elastomer, which comprises a base-treated fluorine-containing elastomer obtained by treating a fluorine-containing elastomer in a basic atmosphere and a thermoplastic resin, the content of the base-treated fluorine-containing elastomer in the composition being 0.1 to 50% by weight.

PREFERRED EMBODIMENTS FOR WORKING THE INVENTION

The present invention will be explained in detail hereinafter.

The resin composition of the present invention is obtained by incorporating a base-treated fluorine-containing elastomer into a thermoplastic resin.

The fluorine-containing elastomer for obtaining the base-treated fluorine-containing elastomer is preferably a copolymer formed from at least vinylidene fluoride as an essential monomer, and specific examples thereof include the following copolymers.

(a): Copolymer formed from vinylidene fluoride and another fluorine-containing olefin.

Examples of the other fluorine-containing olefin which is subjected to the copolymerization with vinylidene fluoride include hexafluoropropylene, pentafluoropropylene, trifluoroethylene, trifluorochloroethylene, tetrafluoroethylene, vinyl fluoride, perfluoromethyl vinyl ether and perfluoropropyl vinyl ether. As this copolymer (a), particularly preferred is a copolymer formed from vinylidene fluoride and hexafluoropropylene.

(b): Block copolymer containing the above copolymer (a) as a soft segment and any one of the following (i), (ii) and (iii) as a hard segment.
(i) A homopolymer of tetrafluoroethylene, or a copolymer formed from tetrafluoroethylene and another fluorine-containing monomer such as hexafluoropropylene, perfluoroalkyl vinyl ether, or the like.
(ii) A homopolymer of trifluorochloroethylene.
(iii) A homopolymer of vinylidene fluoride, or a copolymer formed from vinylidene fluoride and other fluorine-containing monomer such as tetrafluoroethylene, hexafluoropropylene, or the like.

Examples of the commercially available products as the above fluorine-containing elastomer include Daiel (supplied by Daikin Industries, Ltd.), Viton (supplied by du Pont de Nemours & Co.) and Fluorel (supplied by Sumitomo-3M Co.) as the above copolymer (a) and Daiel-Thermoplastic (supplied by Daikin Industries, Ltd.) as the above copolymer (b). As the fluorine-containing elastomer, particularly preferred are Daiel and Viton.

The resin composition of the present invention contains the base-treated fluorine-containing elastomer obtained by treating the above fluorine-containing elastomer in a basic atmosphere. For the treatment in a basic atmosphere, the fluorine-containing elastomer is treated with a basic compound. The basic compound is not limited in the kind so long as it can dissociate or eliminate hydrgen fluoride from the fluorine-containing elastomer skeleton. Specific examples thereof include primary, secondary and tertiary amines such as n-propylamine, isopropylamine, n-butylamine, isobutylamine, dipropylamine, dibutylamine, triethylamine and tributylamine; amides such as N-methyl-2-pyrrolidone, dimethylacetamide, dimethylformamide, 1,3-dimethyl-2-imidazolidinone and N-methylcaprolactam; nitrogen-containing cyclic compounds such as 1,8-diazabicyclo[4.3.0]-7-undecene, pyridine, piperidine, quinoline, indole and imidazole; and alkali metal hydroxides and alkaline earth metal hydroxides such as potassium hydroxide, lithium hydroxide, sodium hydroxide, cesium hydroxide, magnesium hydroxide and calcium hydroxide. It is preferred to use the above amides. The basic compound may be used in the form of a solution in a solvent which can dissolve the above basic compounds, such as tetrahydrofuran, diethylene glycol dimethyl ether, dioxane and sulfolane.

Preferred conditions for the treatment in an inert atmosphere using the basic compound will be specifically explained hereinafter.

At first, the fluorine-containing elastomer and the basic compound are placed in a reactor. The fluorine-containing elastomer and the basic compound may be placed at the same time, or one of the two (preferably the fluorine-containing elastomer) may be placed first, followed by the other. Together with the fluorine-containing elastomer and the basic compound, a solvent (e.g., diethylene glycol dimethyl ether, tetrahydrofuran, sulfolane or dimethylsulfoxide) may be added.

The contacting of the fluorine-containing elastomer and the basic compound is preferably carried out in an atmosphere of an inert gas such as argon or nitrogen. Further, this treatment is preferably carried out with stirring under heat. The preferred heating temperature differs depending upon the kind of the solvent, the kind of the basic compound and the amounts thereof, and the heating temperature therefore cannot be uniformly determined. In general, however, it is from room temperature to 250° C., and the preferred heating time is 0.5 to 10 hours long.

After the above treatment, the reaction mixture is placed in a large amount of water to precipitate the base-treated fluorine-containing elastomer. The precipitated elastomer is recovered by filtration, washed with water and dried to obtain the base-treated fluorine-containing elastomer.

By the above treatment with a basic compound in an inert atmosphere, hydrogen fluoride is eliminated from the fluorine-containing elastomer skeleton, and a carbon-carbon unsaturated bond is formed in said skeleton.

When the so-obtained base-treated fluorine-containing elastomer is incorporated into a thermoplastic resin to be described later, the resultant composition shows further improved impact resistance and improved heat resistance as compared with a thermoplastic resin composition containing a fluorine-containing elastomer which has not been treated with a basic compound in an inert atmosphere.

The reason for the further improvement in impact resistance is not completely clear, while it is assumed that since the base-treated fluorine-containing elastomer has excellent wettability (compatibility) with a thermoplastic resin over a fluorine-containing elastomer which has not been treated with a base, numerous elastomer particles having fine particle diameters are uniformly dispersed in the resin composition, and the elastomer in the composition fully exhibits its properties as an agent for imparting impact resistance.

Further, the reason for the improvement in heat resistance is presumably that the carbon-carbon unsaturated bond formed in the fluorine-containing elastomer skeleton by the treatment in an inert atmosphere using a basic compound catches hydrogen fluoride which is dissociated from the fluorine-containing elastomer skeleton when the fluorine-containing elastomer is exposed to a high temperature.

In the base-treated fluorine-containing elastomer which is a characteristic feature of the present invention, the number of carbon-carbon unsaturated bonds is preferably 1 to 5 per 100 recurring units which constitute the fluorine-containing elastomer. The reason therefor is as follows. When the above number is less than 1, the effects on the improvement in impact resistance and heat resistance are not sufficient. When it exceeds 5, the treatment in a basic atmosphere requires a long time, which is undesirable for economic performance.

According to the present invention, as has been already discussed, numerous elastomer particles having fine particle diameters are uniformly dispersed in the resin composition when the base-treated fluorine-containing elastomer is incorporated into a thermoplastic resin, and the intended object can be accomplished. Specifically, the average particle diameter of the base-treated fluorine-containing elastomer in the composition can be 0.05 to 0.25 $\mu$m. In particular, when the average particle diameter is 0.07 to 0.20 $\mu$m, especially superior effects can be obtained.

In the present invention, the thermoplastic resin to which the above base-treated fluorine-containing elastomer is incorporated is not specially limited, while practical and preferred are those thermoplastic resins which have a molding temperature of at least 250° C., particularly at least 300° C., since the feature of the fluorine-containing elastomer is high heat resistance. Specific examples of the thermoplastic resin include highly heat-resistant noncrystalline resins such as polycarbonate, polyarylate, polyether sulfone, polysulfone and polyetherimide; highly heat-resistant crystalline resins such as polyether ether ketone, polyphenylene sulfide and polycyanoaryl ether; mixtures of these resins alone; mixtures of these resins with other resins.

In the resin composition of the present invention, the amount of the base-treated fluorine-containing elastomer is 0.1 to 50% by weight. The reason therefor is as follows. When the above amount is less than 0.1% by weight, the effect of the base-treated fluorine-containing elastomer cannot be accomplished. When it exceeds 50% by weight, the mechanical strength (strength and elastic modulus) extremely decreases. The above amount is preferably 0.5 to 30% by weight, more preferably 1 to 20% by weight.

When the resin composition of the present invention is constituted by the base-treated fluorine-containing elastomer and the thermoplastic resin alone, the remaining 99.9 to 50% by weight, preferably 99.5 to 70% by weight, more preferably 99 to 80% by weight is constituted by the thermoplastic resin.

The base-treated fluorine-containing elastomer and the thermoplastic resin may be mixed by a melt mixing method or a solution mixing method. In the melt mixing method, the base-treated fluorine-containing elastomer and the thermoplastic resin are melt-kneaded by means of a Banbury mixer, a twin-screw kneader or an extruder, whereby the thermoplastic resin composition containing the fluorine-containing elastomer, provided by the present invention, is obtained. In the other solution mixing method, the base-treated fluorine-containing elastomer and the thermoplastic resin are dissolved, and mixed with each other, in a solvent, and then the solvent is removed from the resultant solution by pouring the solution in a solvent which does not dissolve these polymers to precipitate the resin composition or by heating the solution to remove the solvent, whereby the thermoplastic resin composition containing the fluorine-containing elastomer, provided by the present invention, is obtained.

The above solvent for dissolving the polymers is preferably selected from aprotic polar solvents such as N-methylpyrrolidone, N,N-dimethylformamide, dimethyl sulfoxide, N,N-dimethylacetamide and sulfolane. As the solvent for precipitating the resin composition, methanol, ethanol or water is used, and it is water that can be particularly preferably used.

An optimum method is selected between the above methods depending upon whether the thermoplastic resin is a noncrystalline resin or a crystalline resin.

Further, the thermoplastic resin composition containing a fluorine-containing elastomer, provided by the present invention, can be also obtained by adding the fluorine-containing elastomer to a hot solution when or after the thermoplastic resin is produced by solution polymerization in the presence of a base, and concurrently carrying out the treatment of the fluorine-containing elastomer with a basic compound in an inert atmosphere and the mixing thereof with the thermoplastic resin.

The composition of the present invention may also contain a filler as required in addition to the above two essential components. As the filler, an inorganic or organic filler is used. Specific examples of the inorganic filler include fibrous reinforcing materials such as a glass fiber, an alumina fiber, a silicon carbide fiber and a carbon fiber; and particulate fillers such as calcium carbonate, calcium sulfate, calcium sulfite, magnesium sulfate, mica, titania, zirconia, ferrite, talc, clay, bentonite, montmorillonite, silicon nitride, boron nitride, silicon carbide, carbon black, graphite, iron, copper, zinc and alumina.

On the other hand, specific examples of the organic filler include fluorine resins such as poly(ethylene tetrafluoride), ethylene tetrafluoride-propylene hexafluoride copolymer, an ethylene tetrafluoride-perfluoroalkyl vinyl ether copolymer, an ethylene trifluoride polymer and a vinylidene fluoride polymer, and ultrahigh molecular weight polyethylenes.

The amount of the filler per 100 parts by weight of the essential thermoplastic resin is 1 to 400 parts by weight, preferably 2 to 200 parts by weight, particularly preferably 3 to 100 parts by weight.

Further, the composition of the present invention may contain other additive such as molybdenum disulfide, a lubricant such as graphite, a stabilizer, a colorant and an antioxidant as required.

The present invention will be further explained hereinafter with reference to Examples.

Preparation Example 1

(Preparation of base-treated fluorine-containing elastomer (A))

A 10-liter three-necked separable flask equipped with a stirrer and an argon gas introducing tube was charged with 840 g of Daiel G-801 supplied by Daikin Industries, Ltd. (vinylidene fluoride/hexafluoropropylene copolymer, Mooney viscosity at 100° C.=75) as a fluorine-containing elastomer and 7 liters of N-methylpyrrolidone (NMP) as a basic compound, and under argon current, the mixture was stirred at 200° C. for 30 minutes. This solution was poured into a large amount of water to recover the elastomer, and the elastomer was washed with water several times and dried under reduced pressure. The yield was 820 g. When the so-obtained base-treated fluorine-containing elastomer (A) was measured for FT-IR, an absorption derived from fluorine-substituted carbon-carbon double bond was observed at 1,714 cm$^{-1}$. In $F^{19}$-NMR measurement, an absorption peak of $CF_3$ group substituted in double bond was observed at $-63$ ppm. Further, carbon-carbon double bonds were quantitatively determined on the basis of the ratio of the integral value of $CF_3$ and the integral value of total fluorine peaks to show that the number of the double bonds per 100 pieces of the recurring units was 2.

Preparation Example 2

(Preparation of base-treated fluorine-containing elastomer (B))

A 10-liter three-necked separable flask equipped with a stirrer and an argon gas introducing tube was charged with 840 g of Daiel G-801 supplied by Daikin Industries, Ltd. as a fluorine-containing elastomer, 7 liters of diethylene glycol dimethyl ether and 20 g of potassium hydroxide as a basic compound, and under a flow of argon, the mixture was stirred at 100° C. for 2 hours. This solution was poured into a large amount of water to recover the elastomer, and the elastomer was washed with water several times and dried under reduced pressure. The yield was 790 g. When the so-obtained base-treated fluorine-containing elastomer (B) was measured for FT-IR, an absorption derived from fluorine-substituted carbon-carbon double bond was observed at 1,714 cm$^{-1}$. In $F^{19}$-NMR measurement, an absorption peak of $CF_3$ group substituted in double bond was observed at $-63$ ppm. Further, the quantitative determination was carried out in the same manner as in Preparation Example 1 to show that the number of double bonds per 100 pieces of the recurring units was 3.5.

Preparation Example 3

(Preparation of base-treated fluorine-containing elastomer (C))

A 10-liter three-necked separable flask equipped with a stirrer and an argon gas introducing tube was charged with 840 g of Daiel G-801 supplied by Daikin Industries, Ltd. as a fluorine-containing elastomer, 7 liters of tetrahydrofuran and 10 g of 1,8-diazabicyclo[4.3.0]-7-undecene as a basic compound, and under argon current, the mixture was stirred at 60° C. for 5 hours. This solution was poured into a large amount of water to recover the elastomer, and the elastomer was washed with water several times and dried under reduced pressure. The yield was 850 g. When the so-obtained base-treated fluorine-containing elastomer (C) was measured for FT-IR, an absorption derived from fluorine-substituted carbon-carbon double bond was observed at 1,714 cm$^{-1}$. In F$^{19}$-NMR measurement an absorption peak of CF$_3$ group substituted in double bond was observed at $-63$ ppm. Further, the quantitative determination was carried out in the same manner as in Preparation Example 1 to show that the number of double bonds per 100 pieces of the recurring units was 2.2.

EXAMPLE 1

10 Grams of the elastomer (A) prepared in Preparation Example 1 was dry-blended with 60 g each of polyether sulfone supplied by ICI (VICTREX PES 4800G), polyether ether ketone supplied by ICI (VICTREX PEEK 450G), polyetherimide supplied by GE (ULTEM 1000) and polycyanoaryl ether supplied by Idemitsu Kosan Co., Ltd. (ID-300) which were all thermoplastic resins, and the resultant blends were charged into a laboplast mill mixer supplied by Toyo Seiki K.K. and kneaded at 350° C. at a screw revolution number of 80 rpm for 5 minutes, respectively. Transmission electron microscopic photographs of ultrathin pieces of the resultant kneaded products were taken to obtain particles-dispersed images. The images were analyzed by means of an image analysis apparatus supplied by Stanley Electric K.K. to measure number average particle diameters. Further, the above kneaded products were respectively injection-molded to prepare notched Izod test pieces, and the test pieces were measured for impact-resistant strengths (according to ASTM D-256). Further, the kneaded products in an amount of 1 g each were placed into quartz tubes, and the quartz tubes were set in an electric furnace equipped with a thermometer, a temperature adjuster and air introducing tube, respectively. Then, the quartz tubes were heated at an air flow rate of 0.5 liter/min. at 350° C. for 1 hour to generate decomposition gas. The generated fluorine gas was quantitatively determined by a lanthanum-.Alizarine.Complexon absorptiometric method. Table 1 shows the results.

TABLE 1

| Fluorine-containing elastomer | Thermoplastic resin | Number average diameter of base-treated fluorine-containing elastomer (μm) | Izod impact strength (kg · cm/cm) | Amount of generated hydrogen fluoride (h · mg/g)*5 |
|---|---|---|---|---|
| Base-treated elastomer (A) | PES*1 | 0.10 | 72 | 0.30 |
|  | PEEK*2 | 0.12 | 100 | 0.22 |
|  | PEI*3 | 0.10 | 32 | 0.18 |
|  | PCAE | 0.09 | 38 | 0.12 |

TABLE 1-continued

| Fluorine-containing elastomer | Thermoplastic resin | Number average diameter of base-treated fluorine-containing elastomer (μm) | Izod impact strength (kg · cm/cm) | Amount of generated hydrogen fluoride (h · mg/g)*5 |
|---|---|---|---|---|
| (PEx.1) |  |  |  |  |

*1 PES: Polyether sulfone ηsp/C 0.4
*2 PEEK: Polyether ether ketone ηsp/C 1.0
*3 PEI: Polyetherimide ηsp/C 0.5
*4 PCAE: Polyacyanoaryl ether ηsp/C 1.2
(ηsp/C stands for reduced viscosity in p-chlorophenol at 60° C.)
*5 Amount of generated hydrogen fluoride per hour PEx. = Preparation Example

Comparative Example

Thermoplastic resin compositions containing fluorine-containing elastomers were obtained in the same manner as in Example 1 except that the base-treated fluorine-containing elastomer (A) was replaced with a fluorine-containing elastomer non-treated with a base, and the thermoplastic resin compositions were tested in the same manner as in Example 1. Table 2 shows the results.

TABLE 2

| Fluorine-containing elastomer | Thermoplastic resin | Number average diameter of base-treated fluorine-containing elastomer (μm) | Izod impact strength (kg · cm/cm) | Amount of generated hydrogen fluoride (h · mg/g)*5 |
|---|---|---|---|---|
| Elastomer non-treated with a base | PES*1 | 0.33 | 52 | 1.10 |
|  | PEEK*2 | 0.40 | 22 | 1.30 |
|  | PEI*3 | 0.40 | 11 | 1.61 |
|  | PCAE | 0.35 | 14 | 1.15 |

For *1, 2, 3, 4 and 5, see footnotes to Table 1.

The comparison of Table 1 and Table 2 clearly shows the following. That is, the resin compositions of Example 1, which were obtained by incorporating the base-treated fluorine-containing elastomer (A) to the thermoplastic resins, had remarkably smaller elastomer diameters than the resin compositions of Comparative Example, which were obtained by incorporating the fluorine-containing elastomer non-treated with a base to the thermoplastic resins. Further, when the comparison was made with regard to the identical thermoplastic resin, the resin compositions of Example 1 showed remarkably higher impact resistance. Moreover, the resin Compositions of Example 1 generated a small amount of hydrogen fluoride and had remarkably superior heat resistance as compared with the resin compositions of the Comparative Example.

EXAMPLES 2 and 3

Thermoplastic resin compositions containing fluorine-containing elastomers were obtained in the same manner as in Example 1 except that the base-treated fluorine-containing elastomer (A) was replaced with the base-treated fluorine-containing elastomers (B) and (C), and the thermoplastic resin compositions were tested in the same manner as in Example 1. Tables 3 and 4 show the results.

TABLE 3

| Fluorine-containing elastomer | Thermoplastic resin | Number average diameter of base-treated fluorine-containing elastomer (μm) | Izod impact strength (kg·cm/cm) | Amount of generated hydrogen fluoride (h·mg/g)*5 |
|---|---|---|---|---|
| Base-treated elastomer (B) (PEx.2) | PES*1 | 0.18 | 70 | 0.21 |
| | PEEK*2 | 0.14 | 82 | 0.20 |
| | PEI*3 | 0.09 | 28 | 0.20 |
| | PCAE | 0.11 | 25 | 0.20 |

For *1, 2, 3, 4 and 5 and PEx., see footnotes to Table 1.

TABLE 4

| Fluorine-containing elastomer | Thermoplastic resin | Number average diameter of base-treated fluorine-containing elastomer (μm) | Izod impact strength (kg·cm/cm) | Amount of generated hydrogen fluoride (h·mg/g)*5 |
|---|---|---|---|---|
| Base-treated elastomer (C) (PEx.3) | PES*1 | 0.15 | 70 | 0.28 |
| | PEEK*2 | 0.12 | 77 | 0.22 |
| | PEI*3 | 0.11 | 28 | 0.20 |
| | PCAE | 0.10 | 28 | 0.15 |

For *1, 2, 3, 4 and 5 and PEx., see footnotes to Table 1.

As is clearly shown in Tables 2 and 3, the results obtained in Examples 2 and 3 were as excellent as those in Example 1.

EXAMPLE 4

A 10-liter separable flask equipped with a stirrer, a Dean and Stark type refluxer and an argon gas introducing tube was charged with 684 g of 2,6-dichlorobenzonitrile, 440 g of resorcin, 466 g of sodium carbonate and 4 liters of N-methyl-2-pyrrolidone (NMP), and under a flow of argon, the polymerization reaction was carried out at 195° C. for 2 hours. Then, 6.96 g of 2,6-difluorobenzonitrile was charged into the reaction system, and the polymerization reaction was further continued for 1 hour to give a high-temperature solution in which polycyanoaryl ether as a thermoplastic resin was dissolved. After the polymerization, 5 liters of an NMP solution containing 42 g/1 of Daiel G-801 supplied by Daikin Industries, Ltd. as a fluorine-containing elastomer and having a solution temperature of 60° C. was placed in the above high-temperature solution. Then, an NMP/water mixed solvent (NMP: 4.3 liters/water 1.0 liter) was further charged into the reaction system to precipitate a polymer. Thereafter, the polymer was recovered by filtration, washed with methanol, washed with water and dried under reduced pressure to give a thermoplastic resin composition containing a base-treated fluorine-containing elastomer. The yield was 1,180 g.

The above-obtained resin composition had a reduced viscosity, measured in p-chlorophenol, 0.2 g/dl, at 60° C., of 1.5 dl/g. The obtained powder was pelletized with a twin-screw extruder at 350° C., and injection-molded with an injection molding machine to prepare a test piece, and the test piece was measured for notched Izod impact strength (ASTM D-256) to show 47 kg·cm/cm.

For observing the morphology of the base-treated fluorine-containing elastomer particles, an ultrathin piece was taken from a cut section of the above test piece and observed through a transmission electron microscope (TEM) to show a very fine dispersion state in which the base-treated fluorine-containing elastomer particles had an average particle diameter of 0.13 μm.

As detailed above, according to the present invention, there have been obtained thermoplastic resin compositions containing fluorine-containing a elastomer, which have remarkably improved impact resistance and have improved heat resistance as compared with conventional thermoplastic resin compositions containing a fluorine-containing elastomer.

I claim:

1. A thermoplastic resin composition which comprises (a) a base-treated fluorine-containing elastomer obtained by contacting a fluorine-containing elastomer with a basic compound in an inert atmosphere to form a carbon-carbon unsaturated bond in the fluorine-containing elastomer and (b) a thermoplastic resin, the content of the base-treated fluorine-containing elastomer in the composition being 0.1 to 50% by weight.

2. A composition according to claim 1, wherein the carbon-carbon unsaturated bond is contained in an amount of 1 to 5 per 100 recurring units constituting the fluorine-containing elastomer.

3. A composition according to claim 1, wherein the base-treated fluorine-containing elastomer has an average particle diameter of 0.05 to 0.25 μm.

4. A composition according to claim 1, wherein the fluorine-containing elastomer is a copolymer formed from monomers containing at least vinylidene fluoride.

5. A composition according to claim 4, wherein the copolymer is formed from vinylidene fluoride and another fluorine containing olefin selected from the group consisting of hexafluoropropylene, pentafluororopylene, trifluoroethylene, trifluorochloroethylene, tetrafluoroethylene, vinyl fluoride, perfluoromethyl vinyl ether and perfluoropropyl vinyl ether.

6. A composition according to claim 4, wherein the copolymer is selected from the group consisting of
   (a) a copolymer formed from vinylidene fluoride and another fluorine-containing olefin, and
   (b) a block copolymer containing said copolymer (a) as a soft segment and any of the following (i), (ii) and (iii) as a hard segment:
      (i) a homopolymer of tetrafluoroethylene, or a copolymer formed from tetrafluoroethylene and another fluorine-containing monomer,
      (ii) a homopolymer of tetrafluoroethylene, or
      (iii) a homopolymer of vinylidene fluoride, or a copolymer formed from vinylidene fluoride and another fluorine-containing monomer.

7. A composition according to claim 4, wherein the copolymer is a block copolymer containing (a) a copolymer formed from vinylidene fluoride and another fluorine containing olefin selected from the group consisting of hexafluoropropylene, pentafluoropropylene, trifluoroethylene, trifluorochloroethylene, tetrafluoroethylene, vinyl fluoride, perfluoromethyl vinyl ether and perfluoropropyl vinyl ether and (b) a homopolymer selected from the group consisting of (i) a homopolymer of tetrafluoroethylene, (ii) a homopolymer of trifluorochloroethylene and (iii) a homopolymer of vinylidene fluoride.

8. A composition according to claim 1, wherein the basic compound is selected from the group consisting of amines, amides, nitrogen-containing cyclic compounds, alkali metal hydroxides and alkaline earth metal hydroxides.

9. A composition according to claim 1, wherein the thermoplastic resin is at least one thermoplastic resin selected from the group consisting of polycarbonate, polyarylate, polyether sulfone, polysulfone, polyetherimide, polyether ether ketone, polyphenylene sulfide and polycyanoaryl ether.

10. A composition according to claim 1, wherein the composition is a melt-mixed product of the base-treated fluorine-containing elastomer and the thermoplastic resin.

11. A composition according to claim 1, wherein the composition is a product obtained by dissolving the base-treated fluorine-containing elastomer and the thermoplastic resin in a solvent to form a solution and removing the solvent from the solution.

12. A composition according to claim 1, wherein the composition is a product obtained by adding a fluorine-containing elastomer to a hot thermoplastic resin solution which is obtained during or after the thermoplastic resin is produced by solution polymerization in the presence of a basic compound and an inert atmosphere and carrying out mixing.

13. A composition according to claim 1, wherein the composition further contains a filler.

14. A composition according to claim 13, wherein the filler is an inorganic or organic filler.

15. A composition according to claim 1 wherein the basic compound is selected from the group consisting of n-propylamine, isopropylamine, n-butylamine, isobutylamine, dipropylamine, dibutylamine, triethylamine, tributylamine, N-methyl-2-pyrrolidone, dimethylacetamide, dimethylformamide, 1,3-dimethyl-2-imidazolidinone, N-methylcaprolactam; 1,8-diazabicyclo(4.3.0)-7-undecene, pyridine, piperidine, quinoline, indole, imidazole, potassium hydroxide, lithium hydroxide, sodium hydroxide, cesium hydroxide, magnesium hydroxide and calcium hydroxide.

16. A composition according to claim 15, wherein the base-treated fluorine containing elastomer has an average particle diameter of 0.07 to 0.20 μm.

17. A composition according to claim 16, wherein the thermoplastic resin is at least one thermoplastic resin selected from the group consisting of polycarbonate, polyarylate, polyether sulfone, polysulfone, polyetherimide, polyether ether ketone, polyphenylene sulfide and polycyanoaryl ether.

18. A composition according to claim 17, wherein the base-treated fluorine containing elastomer is in an amount of 0.5 to 30% by weight.

19. A composition according to claim 17, wherein the base-treated fluorine containing elastomer is in an amount of 1 to 20% by weight.

* * * * *

UNITED STATES PATENT AND TRADEMARK OFFICE
CERTIFICATE OF CORRECTION

PATENT NO. : 5,389,725
DATED : February 14, 1995
INVENTOR(S) : Bando

It is certified that error appears in the above-indentified patent and that said Letters Patent is hereby corrected as shown below:

```
On the title page, right column, [56] References Cited,
after "5,039,722...524/100" insert

--FOREIGN PATENT DOCUMENTS 61-176607        8/1986        Japan
  61-176605        8/1986        Japan
  60-133060        7/1985        Japan
  54-122350        9/1979        Japan--.
```

Signed and Sealed this

Seventh Day of May, 1996

Attest:

BRUCE LEHMAN

*Attesting Officer*   *Commissioner of Patents and Trademarks*